United States Patent Office.

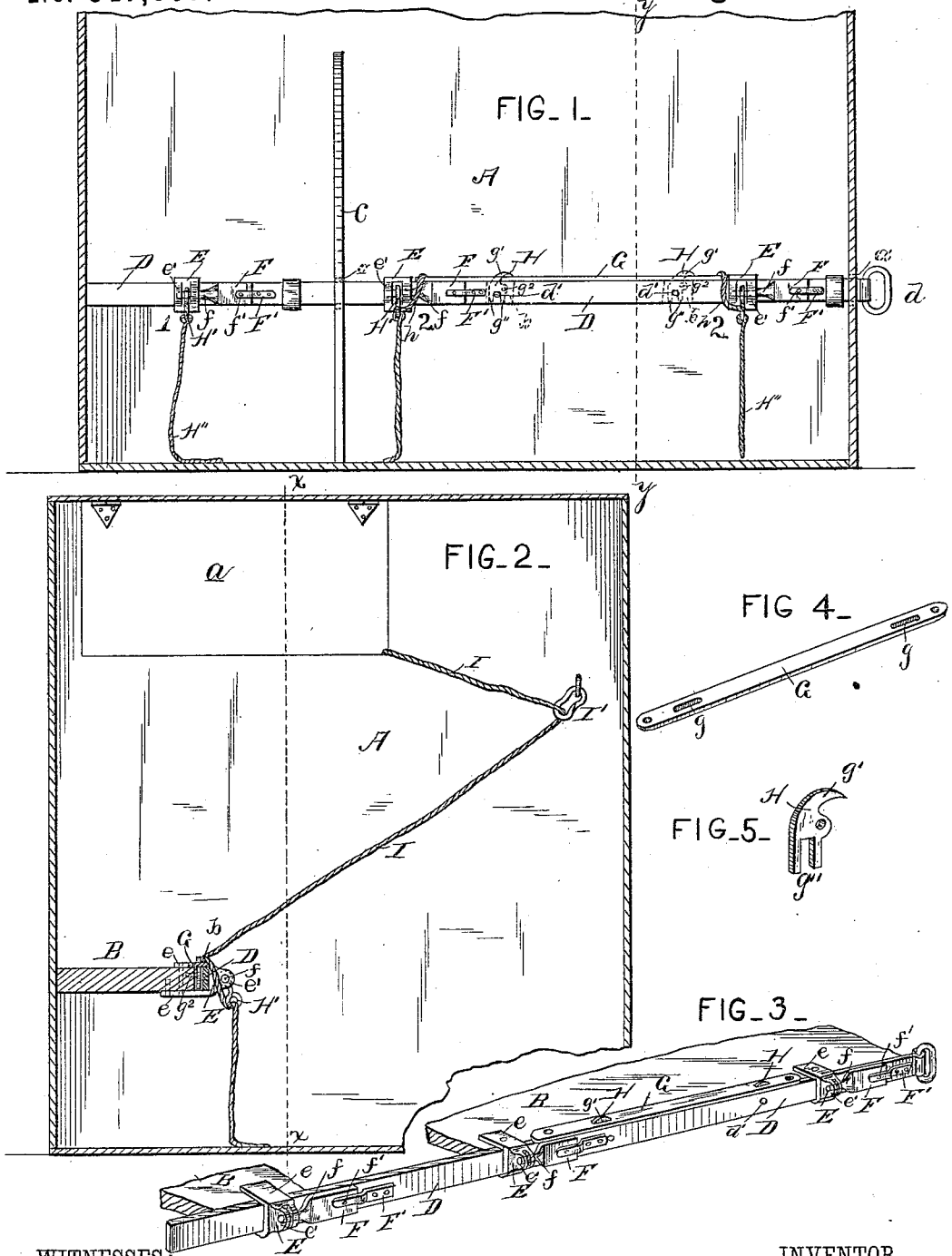
(No Model.)
A. JACOBSON.
DEVICE FOR RELEASING ANIMALS.
No. 347,807. Patented Aug. 24, 1886.

ANDREW JACOBSON, OF FOSTER, MINNESOTA.

DEVICE FOR RELEASING ANIMALS.

SPECIFICATION forming part of Letters Patent No. 347,807, dated August 24, 1886.

Application filed March 27, 1886. Serial No. 196,820. (No model.)

*To all whom it may concern:*

Be it known that I, ANDREW JACOBSON, a citizen of the United States, residing at Foster, in the county of Big Stone and State of Minnesota, have invented new and useful Improvements in Devices for Releasing Animals, of which the following is a specification, reference being had to the accompanying drawings.

My invention relates to improvements in devices for releasing animals in case of danger or fire; and it consists of the peculiar and novel construction and combination of parts, substantially as hereinafter fully set forth, and specifically pointed out in the claims.

The object of my invention is to provide an improved device for releasing animals or cattle that are confined within a building or stable which is on fire or otherwise rendered dangerous for occupation; to provide an improved device for coupling two or more cattle or animals together, and which shall be instantaneously released, so that all of the animals can make their escape together and move in one direction toward the place of exit, and, finally, to provide a device that shall be very simple and durable in construction, effective for the purpose designed, and cheap and inexpensive.

In the accompanying drawings, Figure 1 is a sectional view through a stable on the line $x\ x$ of Fig. 2, showing my invention in front elevation. Fig. 2 is a sectional view taken at right angles to Fig. 1 on the line $y\ y$ of the same figure. Fig. 3 is an enlarged perspective view of my invention detached from the manger. Figs. 4 and 5 are detached detail views, in perspective, of parts of my improvements.

Referring to the drawings, in which like letters of reference denote corresponding parts in all the figures, A designates the stable, barn, or other structure in which the animals or cattle are to be confined, and which has a hinged door, $a$, in its upper end at or near the ceiling.

B designates the mangers, and C designates one of the partitions that divides the stable into stalls.

D designates a movable bar or rod that is fitted so as to slide freely on the outer face of the mangers, and which extends through an opening, $c$, in the partition C and a similar opening, $a'$, in one of the side walls of the structure, where it is provided with a handle, $d$, of any preferred form for its convenient manipulation by hand. This movable rod or bar is confined and held in place by means of keepers E, one of which is provided for each animal to be confined in the stable. Each keeper is provided with two arms, $e$, that are connected together at one end and secured to the mangers at their other ends by means of screws or bolts. The connected ends of the arms having the movable bar or rod fitted therein are provided with spaced lugs $e'$, that are perforated transversely for the passage therethrough of a key, $f$. These keys are formed with angular castings F, that bear against and are detachably secured to the movable rod or bar by means of a spring fastening device, F', which is permanently secured to the bar and provided with a pin, $f'$, that secures the casting thereto detachably. The movable bar may be provided with only one of these keepers and keys to each stall, as shown at 1 in Fig. 1; but I prefer to provide each stall with two keepers, as at 2 in Fig. 1, so as to contain two animals.

When the stall is to contain two animals, I provide a bar or rod, G, which is slotted at or near its ends, as at $g$, and is adapted to rest on the upper face of the manger, immediately above the movable bar thereon.

H designates a detent which engages and retains the coupling-bar G normally in place on the manger, and which comprises a plate having a slotted end that forms two arms, $g''$, and a curved or hook-shaped arm, $g'$, at the opposite end that is adapted to enter one of the slots of and retain in place the coupling-bar G. These detents are pivoted, as at $g^2$, in a recessed portion, $b$, of the manger, that lies in the rear of the movable bar or rod, so that the detents are arranged in the rear of and concealed by the movable bar or rod, which has pins $d'$, that enter the slots between the arms $g''$, so as to oscillate the detents on their pivots and cause the hook-shaped arms to engage and release the coupling-bar.

The coupling-bar is provided at each end or along its length with openings or eyes, to which are connected two or more ropes or other flexible connections, $h$, that are provided with double hooks H', which in turn have the halters H'', that confine the animals to the stall attached thereto. One of the eyes of each of the double hooks is confined between the spaced lugs of the keeper E, and the movable bar or rod is adjusted to adapt the proper keys, f, thereon to enter the lugs and eyes and retain the latter in place, and simultaneously with the adjustment of the movable bar or rod the detents are oscillated by the pins thereon, so that the hook-shaped arms thereof are moved to engage and retain the coupling-bar G in place. Thus it will be seen that in case of a fire in the building, or it is threatened with danger, so as render it unsafe, it will only be necessary to adjust the movable rod D from the outside of the structure, and thus cause the keys to be withdrawn from the keepers and release the double hooks H, that confine the animals to the stalls, thereby simultaneously releasing all the animals and permitting them to make their escape. The coupling-bar will also be released from the hook-shaped arms of the detents, which are actuated by the pins on the movable bar or rod, and the coupling-bar prevents the animals connected thereto from running in different directions, but causes them to all go in the same direction; and to facilitate the escape of the animals connected to the coupling-bar without danger to the attendant, I provide a rope, I, which extends from the coupling-bar to a spring-link, I', suitably supported in the building or structure, and which leads up to the opening or space closed by the hinged door a, by which the attendant can lead or draw the animals to the place of exit.

The operation of my invention will be readily understood from the foregoing description, taken in connection with the drawings.

My improved device is simple and strong in its construction, can be easily and readily operated to instantaneously release all the animals confined in the structure, is cheap and inexpensive, and easily and readily applied or put in place.

I do not desire to limit myself to the precise details of construction and form and proportion of parts herein shown and described as an embodiment of my invention.

Having thus described my invention, what I claim as new, and desire to secure by Letters Patent, is—

1. The combination of a movable bar, a coupling-bar, and detents for confining the coupling-bar actuated by the movable bar to release the coupling-bar, substantially as described.

2. The combination, with the manger, of a movable bar having the keys, the keepers, the detents actuated by the movable bar, and the coupling-bar confined by the detents, substantially as described.

3. The combination of a movable bar having the keys, the keepers for confining the bar to the manger provided with the perforated spaced lugs, the eyes to which the halters are connected, a coupling-bar to which the eyes are connected, and detents for confining and releasing the coupling-bar, substantially as described.

4. The combination of a movable bar, the keepers, pivoted detents concealed and actuated by the movable bar, having hook-shaped arms projecting beyond the movable bar, and a coupling-bar confined and released by said arms of the detents, substantially as described.

5. The combination of a movable bar having the pins and keys, the keepers, pivoted detents concealed by the movable bar having the slotted arms g'' and the hook-shaped arms g', a slotted coupling-bar having the halters connected thereto, and a rope connected to the coupling-bar and leading to the exterior of the structure, substantially as described.

6. The combination of a movable bar having the spring-catches, the detachable castings having the keys and confined on the bar by the catches and a pin, and the keepers having the lugs, substantially as described.

In testimony that I claim the foregoing as my own I have hereto affixed my signature in presence of two witnesses.

ANDREW JACOBSON.

Witnesses:
JOHN McCALLUM,
F. T. PALMER.